Sept. 13, 1927.  DE SOTO E. RICHARDSON  1,642,311
FRUIT PICKING AND THINNING DEVICE
Filed March 24, 1926   2 Sheets-Sheet 1

Inventor
De Soto E. Richardson

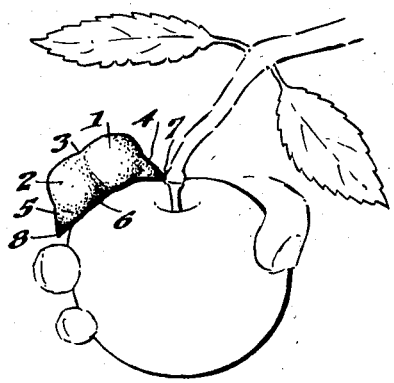
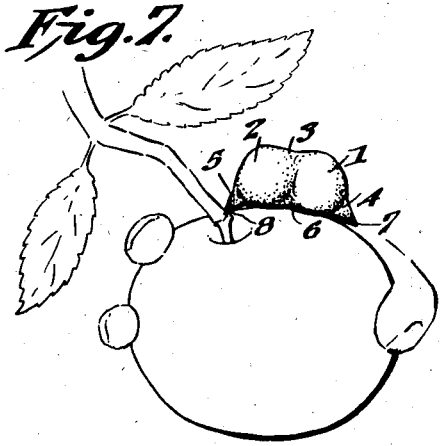
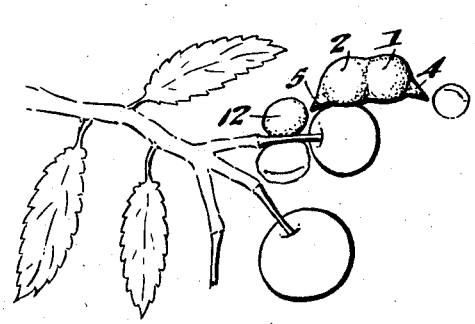
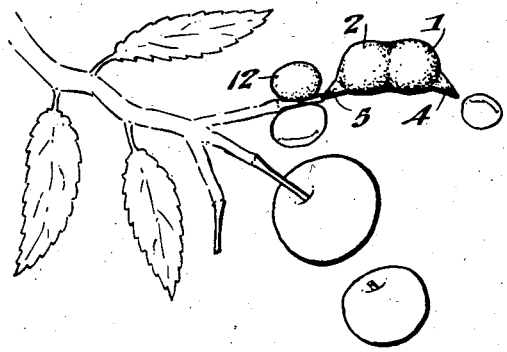
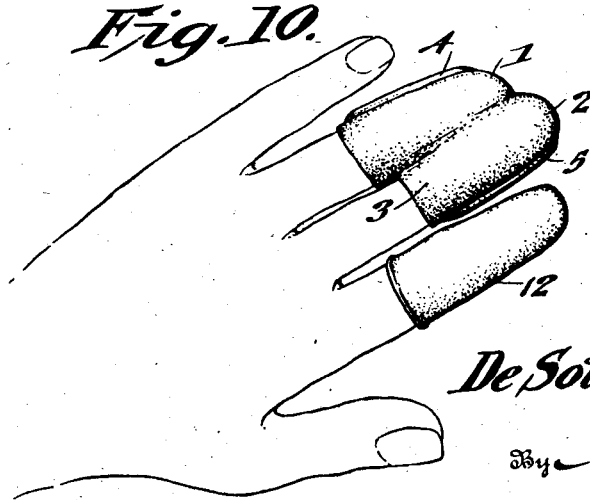

Patented Sept. 13, 1927.

1,642,311

UNITED STATES PATENT OFFICE.

DE SOTO E. RICHARDSON, OF RIVERSIDE, WASHINGTON.

FRUIT PICKING AND THINNING DEVICE.

Application filed March 24, 1926. Serial No. 97,035.

My invention relates to improvements in a fruit picking and thinning device, and particularly to a device of this character intended and adapted for hand picking and thinning of apples and like fruit.

An object of my present invention is to provide a fruit picking device in the form of a stem joint picker, which abruptly breaks the stem at the joint end, thus loosening the fruit without pulling the stem from the fruit.

Another object resides in so constructing the fruit picking device that apples and other fruit will not be marred or finger printed, and at the same time the picker can hold the apples more firmly than with the bare fingers, with less likelihood of dropping the fruit.

Still another object lies in providing a fruit picking and thinning device which can be used to break or flip little apples off the ends of the stems, when thinning, faster and with greater facility than can be accomplished with the bare fingers or with cutting shears and which device completely protects the fingers of the picker principally used in the picking and thinning operation, and which are ordinarily torn and sore from the friction and contact with the fruit and twigs.

With the above and other objects in view, which will be apparent from the specification, drawings and claims, this invention includes certain novel features of construction and combination of parts which will be set forth in connection with the drawings.

In the drawings:

Figure 6 is a somewhat diagrammatic view illustrating one placement of the fingers and the picking device in picking an apple.

Figure 7 is a view similar to Fig. 6 illustrating a different placement of the fingers.

Figure 8 is a partial diagrammatic view showing the location of the fingers and the device in thinning out small fruit.

Figure 9 is a view similar to Fig. 8 illustrating a second step in the thinning operation.

Figure 10 shows the device fitted upon a hand in the manner requisite for ready manipulation in thinning fruit.

In picking fruit for the market, and especially apples it is requisite that the stem be broken abruptly at its joint with the twig instead of pulling the stem out of the fruit, as is often the case by present hand methods. This fruit with the stem pulled out, while the apple itself may be of extra fancy quality, is thrown into the cull grade, which averages ordinarily from 5 to 10 percent total loss. Also, with ordinary hand methods as practiced at present in picking apples, a great loss of next year's crop is always suffered as many fruit spurs are stripped from the twigs with the apples, this loss of fruit spurs often running from 10 percent to 50 percent, and even higher in picking short stemmed apples. All commercial orchards must be thinned in order to produce fancy and extra-fancy apples, this thinning being preferably performed at a time when the little apples are setting on, as the stem is then relatively long. It has also been found advantageous to thin out the little apples by breaking the fruit from the stem without removing the stem from the twig, and this is a particularly difficult operation with the use of the bare hands. My improved fruit picking and thinning device is particularly adapted for use in picking apples of fancy or extra-fancy grades, and will leave the stems intact with the fruit; also, the device can be employed in commercial thinning and will efficiently function to pull or break the little apples from the stem and leave the stems upon the twigs. The device consists primarily of two finger stall portions 1 and 2, secured together as at 3 so that their ends are staggered to correspond with the difference in length of the pointer and middle fingers, and these stall portions, 1 and 2, will be made in different sizes to thus suit all sizes of hands.

Figure 1:
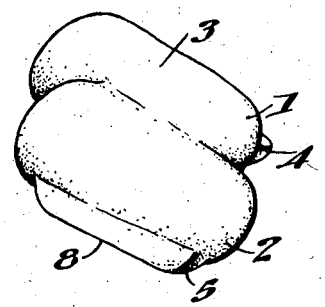
Figure 1 is a view in perspective of the device constructed in accordance with my invention.
Figure 2:
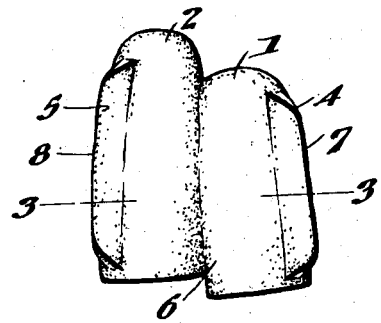
Figure 2 is a bottom plan view.
Figure 3:
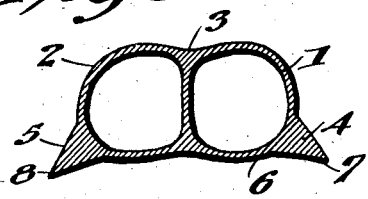
Figure 3 is a transverse section view on line 3—3 of Fig. 2.
Figure 4:
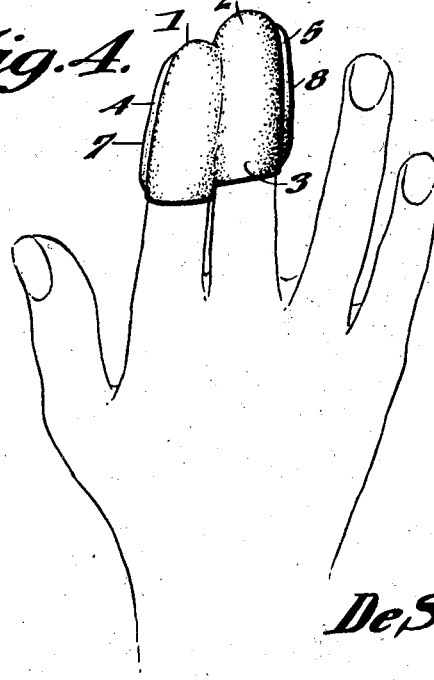
Figure 4 is a view to better show the manner in which the device is fitted upon the fingers for use.

Elongated joint breaker portions 4 and 5 extend longitudinally upon the finger stall portions 1 and 2 and are preferably positioned to project outwardly and slightly downwardly as shown in Fig. 3. It is preferable that the structure be flattened, as at 6, over the lower sides of the finger stall portions 1 and 2 and the breaker members 4 and 5, as this flattened portion will give a smooth surface to engage the apple or other fruit.

The finger stall portions 1 and 2, and the entire structure can be made of more or less soft and elastic rubber which will stretch to properly fit the fingers and will give at the joints, and the finger stall portions can be extended to take in the second joint of each finger if so desired. Also, this soft elastic rubber will serve as a cushion to prevent marring and finger marks on the fruit. The stem breakers 4 and 5 are also preferably of rubber or of other material which will give to conform to the fingers but which possesses sufficient body to give a degree or rigidity to the breaking edges 7 and 8.

Figure 5:
Figure 5 is a view similar to Fig. 4 showing a modified structure.

As illustrated in Fig. 5, the securing strip 9 can be provided in conjunction with the finger stall portions to extend along the back of the hand and the securing band 10 can be provided at the end of this strip to encircle the wrist, fastening 11 holding the band in place to secure the picking and thinning device upon the fingers.

In the more or less diagrammatic illustrations in Figures 6 and 7, I have indicated the relative position of the fingers and thumb with respect to an apple. The apple is grasped, referring to Figure 6, with the twig between the thumb and pointer finger, and the breaking edge of stem breaker 4 is placed in contact with the joint where the stem unites with the twig. A slight movement of the hand will bring the edge of the breaker sharply against the stem joint to break the apple from the twig. In Figure 7 the stem bends at an opposite angle where it joins with the twig and the fingers are then located with the twig between the middle finger and the third finger, in which relation the edge of stem breaker 5 is disposed against the stem joint. A slight twisting or swinging movement of the hand in a direction opposite to the movement in the showing in Figure 6, will break the stem from the twig. By providing two stem breakers in oppositely disposed relation, it is possible for the picker to so grasp the apple that he can break the stem from the twig efficiently and easily, and the grasp upon the apple will be varied to suit the angular disposition of the stem. The thumb and third and fourth fingers are at all times free to aid in holding the apple, and the portion 6 gives an added grip to prevent dropping.

When the device is to be used in thinning apples, it is transferred to the left hand upon which it can be fitted with the finger stall 1 on the third finger and finger stall 2 on the middle finger. With the device fitted in this way, the stem of a small apple is grasped between the pointer finger and the thumb, the thinning device being positioned above the apple, substantially as illustrated in Figure 8. With the stem held firmly, the middle and third fingers are swung down, as indicated in Figure 9, and the small fruit is pulled from the stem, the stem remaining upon the twig. It is apparent that the finger stall members 1 and 2 might be reversed to adapt the device for use as a thinner upon the right hand, and the same is true in adapting the device for use of the left hand in picking.

While I have herein shown and described only certain specific embodiments of the invention and certain possible modifications and variations in the form and construction of the parts and in the use of the device, it will be appreciated that changes and variations can be made without departing from the spirit and scope of my invention.

I claim:

1. A fruit picking and thinning device comprising a pair of finger stall members secured and intimately connected together, and stem breaker members of substantially triangular shape in cross section carried on the outer side of said stall members.

2. A fruit picking and thinning device comprising a pair of finger stall members secured and intimately connected together in staggered relation to fit upon the middle finger and the adjacent finger, and stem breakers extending along the length of the finger stall members on the outer sides thereof.

3. A fruit picking and thinning device comprising a pair of finger stall members secured and intimately connected together, stem breaker members of substantially triangular shape in cross section carried on the outer sides of said stall members, and means to secure the finger stall members in place.

4. A fruit picking and thinning device comprising a pair of finger stall members secured together to be fitted upon adjacent fingers, elongated stem breakers of substantially triangular shape in cross section secured longitudinally upon said finger stall members to project outwardly and to be disposed adjacent the cushion portions of the fingers, a strip extending from said finger stall members on the other side, and a band associated with said strip to be secured around the wrist to hold the device in place.

In testimony whereof I hereunto affix my signature.

DE SOTO E. RICHARDSON.